(12) United States Patent
Xue et al.

(10) Patent No.: US 9,904,005 B2
(45) Date of Patent: Feb. 27, 2018

(54) BACKLIGHT MODULE AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventors: Yinyan Xue, Beijing (CN); Dejun Li, Beijing (CN); Yang Yang, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 0 days.

(21) Appl. No.: 15/103,090

(22) PCT Filed: Dec. 15, 2015

(86) PCT No.: PCT/CN2015/097424
§ 371 (c)(1),
(2) Date: Jun. 9, 2016

(87) PCT Pub. No.: WO2016/184088
PCT Pub. Date: Nov. 24, 2016

(65) Prior Publication Data
US 2017/0146728 A1    May 25, 2017

(30) Foreign Application Priority Data
May 19, 2015  (CN) .......................... 2015 1 0258027

(51) Int. Cl.
*F21V 7/04*    (2006.01)
*F21V 8/00*    (2006.01)

(52) U.S. Cl.
CPC ......... *G02B 6/0091* (2013.01); *G02B 6/0088* (2013.01)

(58) Field of Classification Search
CPC .................................. G02B 6/00; G02B 6/0091
See application file for complete search history.

(56) References Cited

U.S. PATENT DOCUMENTS

| 8,525,999 B2 * | 9/2013 | Brukilacchio | A61B 1/0653 |
| | | | 356/432 |
| 2013/0163279 A1 * | 6/2013 | Peng | G02B 6/0011 |
| | | | 362/609 |

FOREIGN PATENT DOCUMENTS

| CN | 1971359 A | 5/2007 |
| CN | 202093200 U | 12/2011 |

(Continued)

OTHER PUBLICATIONS

First Office Action regarding Chinese application No. 201510258027.5, dated Sep. 1, 2016. Translation provided by Dragon Intellectual Property Law Firm.

(Continued)

*Primary Examiner* — Ali Alavi
(74) *Attorney, Agent, or Firm* — Harness, Dickey & Pierce, P.L.C.

(57) ABSTRACT

The present disclosure provides a backlight module and a display device. The backlight module includes a back plate and a light guide plate on the back plate. The light guide plate includes a light incidence side. An edge of the light guide plate that is adjacent to the light incidence side has an inclined first portion. An angle defined between the inclined first portion and the light incidence side is an obtuse angle. At least one first column is on the back plate at a position corresponding to the first portion of the edge adjacent to the light incidence side of the light guide plate. Each first column is in contact with the first portion of the light guide plate.

12 Claims, 3 Drawing Sheets

(56) References Cited

FOREIGN PATENT DOCUMENTS

| | | |
|---|---|---|
| CN | 202132886 U | 2/2012 |
| CN | 102494273 A | 6/2012 |
| CN | 102661528 A | 9/2012 |
| CN | 102748668 A | 10/2012 |
| CN | 103134007 A | 6/2013 |
| CN | 103322469 A | 9/2013 |
| CN | 203927579 U | 11/2014 |
| CN | 104806931 A | 7/2015 |
| JP | 2004199930 A | 7/2004 |

OTHER PUBLICATIONS

Written Opinion of the International Searching Authority for international application No. PCT/CN2015/097424.
Second Office Action regarding Chinese Application No. 201510258027.5, dated Apr. 19, 2017. Translation provided by Dragon Intellectual Property Law Firm.

\* cited by examiner

BACKLIGHT MODULE AND DISPLAY DEVICE

CROSS-REFERENCE TO RELATED APPLICATIONS

This application is the U.S. national phase of PCT Application No. PCT/CN2015/097424 filed on Dec. 15, 2015, which claims a priority to Chinese Patent Application No. 201510258027.5 filed on May 19, 2015, the disclosures of which are incorporated in their entirety by reference herein.

TECHNICAL FIELD

The present disclosure relates to the technical field of liquid crystal display technologies, in particular to a backlight module and a display device.

BACKGROUND

The Liquid Crystal Display (LCD for short) has numerous advantages such as a thin body, power saving et al, and thus it is used widely. Most of the liquid crystal display devices on the market are backlight type liquid crystal display devices, of which each includes a liquid crystal panel and a backlight module. The operating principle of the liquid crystal panel goes as follows: liquid crystal molecules are placed between two pieces of parallel glass substrates; a number of vertical and horizontal fine wires are present between the two pieces of parallel glass substrates so as to control the liquid crystal molecules to change directions by means of powering on or off, thereby reflecting out the light that comes from the backlight module for generating pictures. Since the liquid crystal panel does not emit light itself, the liquid crystal panel displays images with help of a light source provided by the backlight module. Accordingly, the backlight module becomes one of the key components of the liquid crystal display device. According to different incident positions of a light source, the backlight module can be divided into two types, i.e. a side type backlight module and a direct type backlight module. As for the direct type backlight module, a light emitting source such as a cold cathode fluorescent lamp (CCFL for short) or a light emitting diode (LED for short) is disposed behind the liquid crystal panel and directly forms a surface light source for the liquid crystal panel. As for the side type backlight module, a LED light bar of the backlight source is disposed at an edge of the back plate behind the liquid crystal panel side, light emitted from the LED light bar enters a light guide plate from a light incidence surface of the light guide plate and is emitted out from a light emitting surface of the light guide plate after undergoing reflection and the diffusion, and finally forms a surface light source for the liquid crystal panel via an optical film set.

The direct type backlight sources are mostly used in the liquid crystal display products of large sizes such as a computer, a television and the like, and the side type backlight sources are mostly used in the liquid crystal display products of small sizes such as a tablet computer, a mobile phone and the like. In the backlight module of the side type backlight source in the relevant art, the light guide panel is positioned relative to the back plate by a recess defined in an edge of the light guide plate. In addition, regarding the design scheme in the related art, a gap of about 1 mm needs to be pre-reserved between the recess of the light guide plate and the back plate upon designing for ensuring that the light guide panel can have free space for expansion and contraction when performing a reliability test. The above-mentioned method of pre-reserving gap indeed ensures the expansion and contraction of the light guide plate. However, the light guide plate and the light bar are not easily to be aligned accurately upon assembling. As a result, the assembly of the light guide plate is shifted, which results in uneven brightness of the formed display screen and uneven light and dark phenomenon occurring at displayed pictures, thereby seriously affecting display quality of the pictures.

SUMMARY

Embodiments of the present disclosure provide a backlight module and a display device, which can solve the problem of inaccurate alignment between a light guide plate and a backlight source when assembling a backlight module in the related art, and which can make brightness of a display screen even, ensure light and dark of displayed pictures even, and improve display quality of the pictures.

In order to achieve the above object, the embodiments of the present disclosure adopt the following technical solutions.

In one aspect, a backlight module is provided and includes a back plate and a light guide plate on the back plate. The light guide plate includes a light incidence side. An edge of the light guide plate that is adjacent to the light incidence side has an inclined first portion, and an angle defined between the inclined first portion and the light incidence side is an obtuse angle. At least one first column is on the back plate at a position corresponding to the first portion, and each first column is in tight contact with the first portion of the light guide plate.

Further, the light guide plate includes at least one first recess in an edge of the light guide plate opposite to the light incidence side of the light guide plate. A second column is on the back plate at a position corresponding to each first recess, and a gap is present between the second column and a bottom of the first recess.

Further, the light guide plate includes at least one second recess in a portion except for the inclined portion of at least one edge adjacent to the light incidence side of the light guide plate, and a second column is on the back plate at a position corresponding to each second recess, and a gap is present between the second column and a lateral edge of the second recess that is close to the light incidence side.

Further, a gap between the second column and a bottom of the first recess is in a range of from 1 mm to 1.5 mm.

Further, a gap between the second column and the lateral edge of the second recess that is close to the light incidence side is in a range of from 1 mm to 1.5 mm.

Further, the edge adjacent to the light incidence side of the light guide plate further includes a second portion; wherein the second portion is perpendicular to the light incidence side, and the first portion is connected to the light incidence side.

Further, each of the first column and the second column includes a protrusion column and a sleeve; the sleeve is disposed at a periphery of the protrusion column, and the protrusion column is made of metal.

Further, the angle defined between the light incidence side and each inclined first portion is identical.

Further, the angle defined between the light incidence side and each inclined first portion is equal to or greater than 150° C. but smaller than 180° C.

In another aspect, a display device is provided and includes any backlight module according to the first aspect.

The embodiments of the present disclosure further provide a backlight module, which includes: a back plate with at least one first column; and a light guide plate on the back plate. The light guide plate includes a light incidence side and a first portion; the first portion is inclined with respect to a vertical direction and in tight contact with the first column.

Further, the light incidence side is a horizontal surface of the light guide plate, and the first portion extends upwards and outwards from the light incidence side with an obtuse angle defined with respect to the light incidence side.

Further, the light guide plate includes at least one first recess in an edge opposite to the light incidence side; a second column is on the back plate at a position corresponding to each first recess, and a gap is present between the second column and a bottom of the first recess.

Further, the light guide plate includes a second portion disposed in a vertical direction, and the second portion is connected to the first portion, and at least one of an edge opposite to the light incidence side and the second portion is provided with at least one recess, a second column is on the back plate at a position corresponding to each recess; the second column is in the recess and has a gap with a bottom of the recess.

Further, the light incidence side is a horizontal surface of the light guide plate; the light guide plate includes a second portion disposed in a vertical direction; the second portion is connected to the light incidence side, and the first portion extends upwards and outwards from the second portion with an obtuse angle defined with respect to the light incidence side.

Further, the light incidence side is a horizontal surface of the light guide plate; the light guide portion includes a second portion, which extends upwards and internally from the light incidence side with an acute angle defined with respect to the light incidence side; the first portion extends upwards and outwards from the second portion with an obtuse angle defined with respect to the light incidence side, and the second portion is in tight contact with the corresponding column on the back plate.

As for the backlight module and the display device provided in the embodiments of the present disclosure, the first portion of one edge of the light guide plate that is adjacent to the light incidence side of the light guide plate is inclined, at least one first column is disposed on the back plate at a position corresponding to the first portion of the edge adjacent to the light incidence side of the light guide plate, and simultaneously, each first column is in a tight contact with the first portion of the light guide plate. In this way, when performing a reliability test, since the first portion of the edge of the light plate adjacent to the light incidence side is inclined, thus the light guide plate may move when the light guide plate is heated to expand and may restore to an initial position under the function of gravity when the light guide plate is cooled to contract. This can ensure space for the expansion and contraction of the light guide plate. Meanwhile, since the column is provided on the back plate at the position corresponding to the first portion, thus, the position of the light guide plate on the back plate can be ensured when the backlight module is assembled, thereby avoiding the defect of inaccurate alignment between the light guide plate and the backlight source while solving the problem of inaccurate alignment between the light guide plate and the light bar when assembling one backlight module in the related art. As a result, the brightness of the display screen is even, the light and dark of displayed pictures is even and the display quality of the pictures is improved.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The technical solutions of embodiments of the present disclosure will be described hereinafter in a clear and complete manner in conjunction with the drawings. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
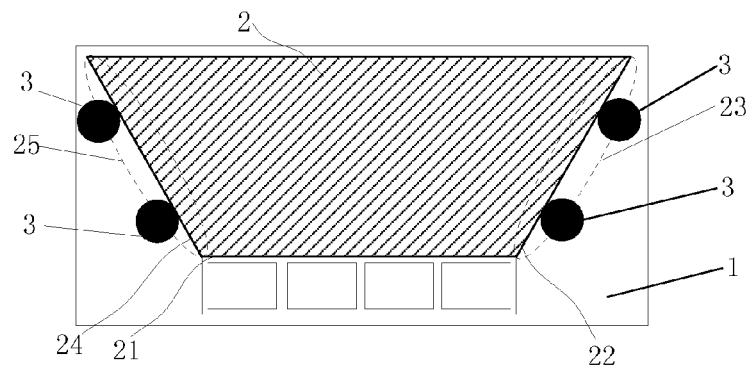
FIG. 1 is a schematic view showing a structure of a backlight module according to one embodiment of the present disclosure.

One embodiment of the present disclosure provides a backlight module. As shown in FIG. 1, the backlight module includes a back plate 1 and a light guide plate 2 on the back plate 1. The light guide plate 2 includes a light incidence side 21.

An edge 22 of the light guide plate 2 adjacent to the light incidence side 21 of the light guide plate has an inclined first portion 23. Meanwhile, an edge 24 of the light guide plate 2 adjacent to the light incidence side 21 has an inclined first portion 25.

An angle defined between the inclined first portion 23 and the light incidence side is an obtuse angle.

At least one first column 3 is disposed on the back plate 1 at a position corresponding to the first potion 23 of the edge 22 adjacent to the light incidence side 21 of the light guide plate 2. At least one first column 3 is also disposed on the back plate 1 at a position corresponding to the first portion 25 of the edge 24 adjacent to the light incidence side 21 of the light guide plate 2.

Each first column 3 is in a tight contact with the first portion 23(25) of the light guide plate 2 to limit the first portions.

Specifically, the first portion may be the entire edge adjacent to the light incidence side or a portion of the edge adjacent to the light incidence side. FIG. 1 illustrates an example that the first portion is the entire edge adjacent to the light incidence side and two first columns are disposed on the back plate at positions corresponding to the inclined portion of each edge adjacent to the light incidence side. The first column is fixed on the back plate, and may be made of the same material as that of the back plate so as to reduce the production costs. The number of the first columns on the back plate is not specifically limited, and it may be set according to actual requirements and the minimization of the production costs during the specific design.

As for the backlight module provided in one embodiment of the present disclosure, the first portion of one edge of the light guide plate that is adjacent to the light incidence side of the light guide plate is inclined, at least one first column is disposed on the back plate at a position corresponding to the first portion of the edge adjacent to the light incidence side of the light guide plate, and simultaneously, each first column is in a tight contact with the first portion of the light guide plate. In this way, when performing a reliability test, since the first portion of the edge of the light plate adjacent to the light incidence side is inclined, thus the light guide plate may move when the light guide plate is heated to expand and may restore to an initial position under the function of gravity when the light guide plate is cooled to contract. This can ensure space for the expansion and contraction of the light guide plate. Meanwhile, since the column is provided on the back plate at the position corresponding to the first portion, thus, the position of the light guide plate on the back plate can be ensured when the backlight module is assembled, thereby avoiding the defect of inaccurate alignment between the light guide plate and the backlight source while solving the problem of inaccurate alignment between the light guide plate and the light bar when assembling one backlight module in the related art. As a result, the brightness of the display screen is even, the light and dark of displayed pictures is even and the display quality of the pictures is improved.

Figure 2:
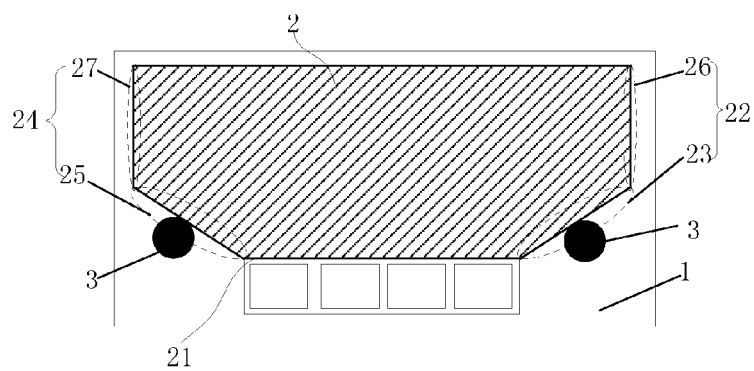
FIG. 2 is a schematic view showing a structure of a backlight module according to another embodiment of the present disclosure.

Further, as shown in FIG. 2, the edge adjacent to the light incidence side 21 of the light guide plate also includes a second portion.

A second portion 26 of the edge 22 adjacent to the light incidence side 21 of the light guide plate 2 is perpendicular to the light incidence side 21. Meanwhile, a second portion 27 of the edge 24 adjacent to the light incidence side 21 of the light guide plate 2 is also perpendicular to the light incidence side 21.

The first portion is connected to the light incidence side.

Specifically, the first portion of the light guide plate of the backlight module shown in FIG. 2 refers to a portion of an edge of the light guide plate that is adjacent to the light incidence side. The edge adjacent to the light incidence side includes the first and second portions. The second portion refers to a portion of the edge adjacent to the light incidence side of the light guide plate except for the first portion. With such a configuration, it is ensured that the light guide plate on the backlight module does not vary in position after going through a reliability test and that the light emitted from a backlight source can be used comprehensively so as to better keep even brightness of the display screen. Specifically, the reason why the light guide plate of the backlight module provided in this embodiment is still at an initial position in the backlight module after undergoing expansion and contraction goes as follows: when being heated to expand, the light guide plate can generate an outward acting force F which is perpendicular to the inclined edge of the light guide plate, at the first column on the back plate. According to the mechanical principle, the force F may be decomposed into an acting force F1 which is perpendicular to the direction of the acting force F, and a vertical downward acting force F2. The first column tends to rotate under the function of the acting force F1, however, the first column is fixed on the back plate. The acting force F2 can generate a vertical upward counter-acting force F3 on the light guide plate, and the light guide plate can move upwards under the function of the acting force F3. Then, when the light guide plate is cooled to contract, the light guide plate moves downwards due to the influence of its own gravity. Simultaneously, the light guide plate can move to the initial position due to the presence of the first columns.

Figure 3:
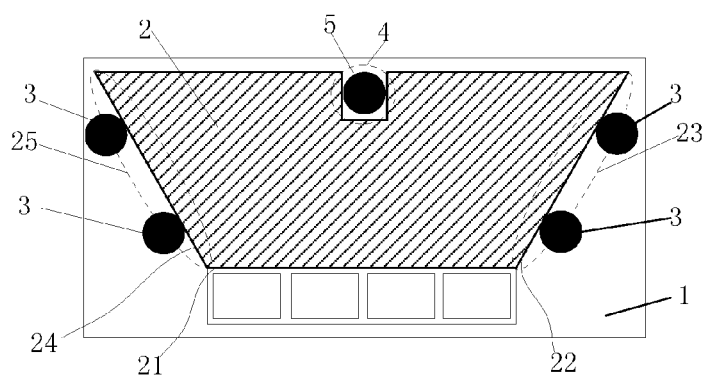
FIG. 3 is a schematic view showing a structure of a backlight module according to still another embodiment of the present disclosure.
Figure 4:
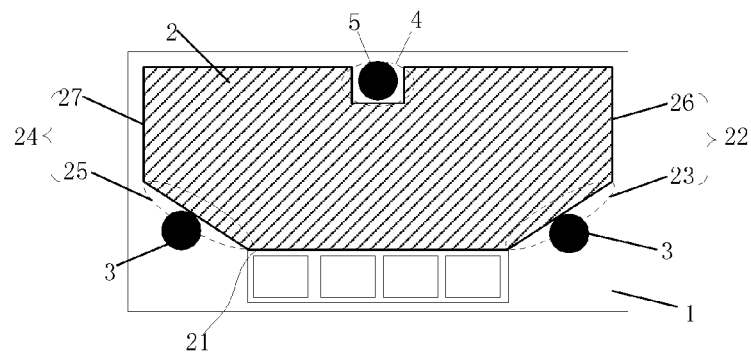
FIG. 4 is a schematic view showing a structure of a backlight module according to yet another embodiment of the present disclosure.

Further, as shown in FIGS. 3 and 4, at least one first recess 4 is provided in the light guide plate 2 at an edge opposite to the light incidence side 21 of the light guide plate 2.

A second column 5 is provided on the back plate 1 at a position corresponding to each first recess 4. A gap is present between the second column 5 and a bottom of the first recess 4.

The presence of the gap between the second column and the bottom of the first recess can ensure enough space for a movement of the light guide plate when the light guide plate is heated to expand and guarantee that the light guide plate can restore to its initial position when the light guide plate is cooled to contract.

The gap between the second column 5 and the bottom of the first recess 4 is in a range from 1 mm to 1.5 mm.

Figure 5:
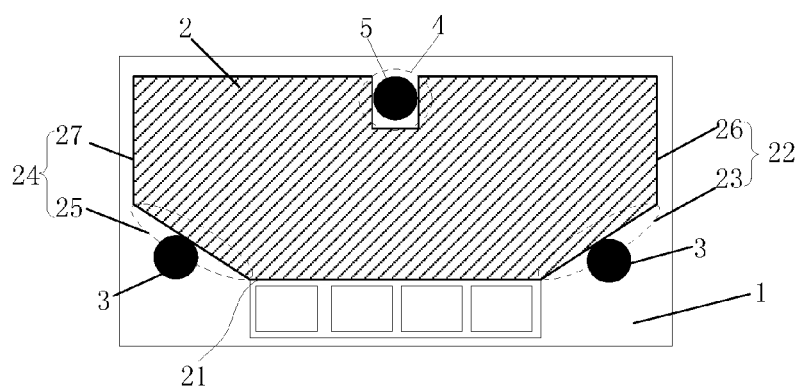
FIG. 5 is a schematic view showing a structure of a backlight module according to yet another embodiment of the present disclosure.

The second column may be spaced apart from or in contact with a lateral side of the first recess. Of course, as shown in FIGS. 3 and 5, the second column may be in close contact with a lateral edge of the first recess. In this way, the alignment accuracy can be further ensured upon assembling the backlight module, and an accurate alignment between the backlight source and the light guide plate can be guaranteed.

Further, at least one second recess 6 is disposed in the light guide plate 2 at a portion which is not inclined of at least one edge adjacent to the light incidence side 21.

Figure 6:
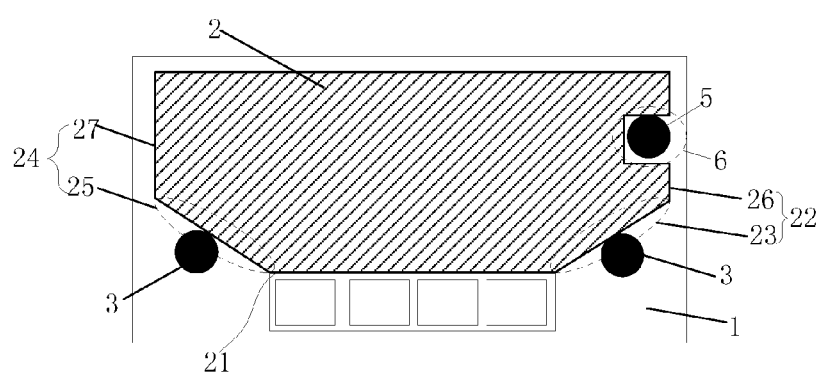
FIG. 6 is a schematic view showing a structure of a backlight module according to still yet another embodiment of the present disclosure.

FIG. 6 illustrates an example that at least one said second recess 6 is provided in the light guide plate 2 at a portion that is not disposed in an inclined manner of the edge 22 adjacent to the light incidence side 21. Of course, the second recess may be disposed in the edge 24 or provided in both of the edges 22 and 24.

A second column 5 is provided on the back plate 1 at a position corresponding to each second recess 6. A gap is present between the second column 5 and a lateral edge of the second recess 6 close to the light incidence side 21.

The gap between the second column 5 and the lateral edge of the second recess 6 that is adjacent to the light incidence side 21 is in a range of from 1 mm to 1.5 mm.

The presence of the gap between the second column and the lateral edge of the second recess that is adjacent to the light incidence side can ensure enough space for a movement of the light guide plate when the light guide plate is heated to expand and guarantee that the light guide plate can restore to its initial position when the light guide plate is cooled to contract.

It is to be noted that the presence of the first or second recess in the light guide plate and the presence of the second column on the back plate at a position that corresponds to the first or second recess may further ensure stability of the light guide plate on the basis of ensuring that the light guide plate on the backlight module does not move in position after going through a reliability test in order to guarantee the even brightness of the final display screen.

Figure 7:
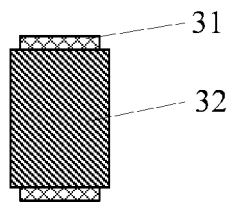
FIG. 7 is a schematic view showing a structure of each of a first column and a second column in the backlight module according to one embodiment of the present disclosure.
Figure 8:
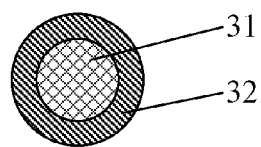
FIG. 8 is a schematic view showing a structure of each of the first column and the second column in the backlight module according to one embodiment of the present disclosure.

Specifically, as shown in FIGS. 7 and 8, each of the first column and the second column includes a protrusion column 31 and a sleeve 32. The sleeve 32 is disposed at a periphery of the protrusion column 31. The material of the sleeve 32 is metal.

The shape and the material of the first column and the shape and the material of the second column may be the same, which may lower the process difficulty and reduce both process steps and costs, Specifically, the angles defined between the light incidence side of the light guide plate and each inclined edge of the light guide portion, i.e. the first portion, are identical.

Alternatively, the angles defined between the light incidence side of the light guide plate and each inclined edge of the light guide portion, i.e. the first portion, are equal to or greater than 150° C. but smaller than 180° C.

Figure 9:
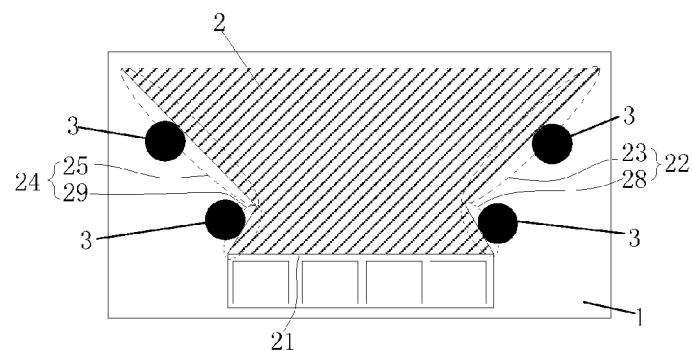
FIG. 9 is a schematic view showing a structure of a backlight module according to yet another embodiment of the present disclosure.
Figure 10:
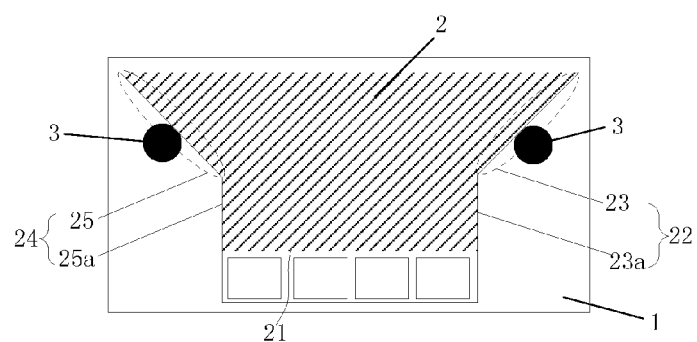
FIG. 10 is a schematic view showing a structure of a backlight module according to yet another embodiment of the present disclosure.

The structure of the backlight module provided in one embodiment of the present disclosure is shown in FIG. 9. The first portion 23 of the edge 22 of the light guide plate 2 is connected to an edge opposite to the light incidence side, and the first portion 25 of the edge 24 of the light guide plate 2 is also connected to the edge opposite to the light incidence side. A portion 28 of the edge 22 except for the first portion 23 and a portion 29 of the edge 24 except for the first portion 25 are connected to the light incidence side with an acute angle defined between the light incidence side and each of the portions 28, 29. At this time, at least one first column is disposed on the back plate at a position corresponding to each of the portion 28 of the edge 22 and the portion 29 of the edge 24. At least one first column is also disposed on the back plate at a position corresponding to each of the first portions 23 and 25. Then, the position of the light guide plate on the back plate is more stable, thereby ensuring that the light guide plate does not shake. Of course, FIG. 9 just illustrates an example showing the presence of one first column at each part of the edges 22 and 24. In addition, the structure of the backlight module may be that shown in FIG. 10. In the embodiment shown in FIG. 10, the light guide plate 2 includes a light incidence side 21, a first portion 23(25) and a second portion 23a(25). The second portion 23a(25) is disposed in a vertical direction, and is connected to the light incidence side 21. The first portion 23(25) extends upwards and outwards from the second portion 23a(25) with an obtuse angle defined with respect to the light incidence side 21.

It is to be noted that the drawings in the embodiments illustrate examples in which the backlight source is at a lower side of the light guide plate, but it is not limited that the backlight source has to be at the lower side of the light guide plate. Of course, during actual uses, the backlight source may be provided at the left side or the right side of the light guide plate, and the light guide plate may be used as long as it has a shape that can satisfy the features of the present disclosure.

As for the backlight module provided in one embodiment of the present disclosure, the first portion of one edge of the light guide plate that is adjacent to the light incidence side of the light guide plate is inclined, at least one first column is disposed on the back plate at a position corresponding to the first portion of the edge adjacent to the light incidence side of the light guide plate, and simultaneously, each first column is in a tight contact with the first portion of the light guide plate. In this way, when performing a reliability test, since the first portion of the edge of the light plate adjacent to the light incidence side is inclined, thus the light guide plate may move when the light guide plate is heated to expand and may restore to an initial position under the function of gravity when the light guide plate is cooled to contract. This can ensure space for the expansion and contraction of the light guide plate. Meanwhile, since the column is provided on the back plate at the position corresponding to the first portion, thus, the position of the light guide plate on the back plate can be ensured when the backlight module is assembled, thereby avoiding the defect of inaccurate alignment between the light guide plate and the backlight source while solving the problem of inaccurate alignment between the light guide plate and the light bar when assembling one backlight module in the related art. As a result, the brightness of the display screen is even, the light and dark of displayed pictures is even and the display quality of the pictures is improved.

One embodiment of the disclosure provides a display device, which may include any backlight module provided in the embodiments corresponding to FIGS. 1-6. The display device may be any product or component that has the display function such as an OLED panel, a mobile phone, a tablet computer, a television, a monitor, a notebook computer, a digital photo frame, a navigator and the like.

As for the display device provided in one embodiment of the present disclosure, the first portion of one edge of the light guide plate that is adjacent to the light incidence side of the light guide plate is inclined, at least one first column is disposed on the back plate at a position corresponding to the first portion of the edge adjacent to the light incidence side of the light guide plate, and simultaneously, each first column is in a tight contact with the first portion of the light guide plate. In this way, when performing a reliability test, since the first portion of the edge of the light plate adjacent to the light incidence side is inclined, thus the light guide plate may move when the light guide plate is heated to expand and may restore to an initial position under the function of gravity when the light guide plate is cooled to contract. This can ensure space for the expansion and contraction of the light guide plate. Meanwhile, since the column is provided on the back plate at the position corresponding to the first portion, thus, the position of the light guide plate on the back plate can be ensured when the backlight module is assembled, thereby avoiding the defect of inaccurate alignment between the light guide plate and the backlight source while solving the problem of inaccurate alignment between the light guide plate and the light bar when assembling one backlight module in the related art. As a result, the brightness of the display screen is even, the light and dark of displayed pictures is even and the display quality of the pictures is improved.

The above are merely the preferred embodiments of the present disclosure, and the present disclosure is not limited thereto. A person skilled in the art may make further modifications and improvements without departing from the principle/spirit of the present disclosure, and these modifications and improvements shall also fall within the scope of the present disclosure. Hence, the scope of the present disclosure is subject to the appended claims.

What is claimed is:

1. A backlight module comprising:
   a back plate; and
   a light guide plate on the back plate;
   wherein the light guide plate comprises a light incidence side;
   wherein an edge of the light guide plate that is adjacent to the light incidence side has an inclined first portion, and an angle defined between the inclined first portion and the light incidence side is an obtuse angle;
   wherein the backlight module further comprises at least one first column on the back plate at a position corresponding to the first portion, and each first column is in contact with the first portion of the light guide plate;
   wherein the light guide plate comprises at least one first recess in an edge of the light guide plate opposite to the light incidence side of the light guide plate;
   wherein the backlight module further comprises a second column on the back plate at a position corresponding to each first recess, and a gap is present between the second column and a bottom of the first recess.

2. The backlight module according to claim 1, wherein the light guide plate comprises at least one second recess in a portion except for the inclined portion of at least one edge adjacent to the light incidence side of the light guide plate, and
   the backlight module further comprises an another second column on the back plate at a position corresponding to each second recess, and a gap is present between the another second column and a lateral edge of the second recess that is close to the light incidence side.

3. The backlight module according to claim 2, wherein the gap between the another second column and the lateral edge of the second recess that is close to the light incidence side is in a range of from 1 mm to 1.5 mm.

4. The backlight module according to claim 1, wherein the gap between the second column and the bottom of the first recess is in a range of from 1 mm to 1.5 mm.

5. A display device comprising: the backlight module according to claim 1.

6. The backlight module according to claim 1, wherein the edge adjacent to the light incidence side of the light guide plate further comprises a second portion;
   wherein the second portion is perpendicular to the light incidence side, and the first portion is connected to the light incidence side.

7. The backlight module according to claim 1, wherein each of the first column and the second column comprises a protrusion column and a sleeve; the sleeve is disposed at a periphery of the protrusion column, and the protrusion column is made of metal.

8. The backlight module according to claim 1, wherein the angle defined between the light incidence side and each inclined first portion is identical.

9. The backlight module according to claim 1, wherein the angle defined between the light incidence side and each inclined first portion is equal to or greater than 150° C. but smaller than 180° C.

10. A backlight module comprising:
    a back plate with at least one first column; and
    a light guide plate on the back plate;
    wherein the light guide plate comprises a light incidence side and a first portion; the first portion is inclined with respect to a vertical direction and in contact with the first column;
    wherein the light incidence side is a horizontal surface of the light guide plate; the light guide plate comprises a second portion disposed in a vertical direction; the second portion is connected to the light incidence side, and the first portion extends upwards and outwards from the second portion with an obtuse angle defined with respect to the light incidence side.

11. A backlight module comprising:
    a back plate with at least one first column; and
    a light guide plate on the back plate;
    wherein the light guide plate comprises a light incidence side and a first portion; the first portion is inclined with respect to a vertical direction and in contact with the first column;
    wherein the light incidence side is a horizontal surface of the light guide plate; the light guide plate comprises a second portion, which extends upwards and internally from the light incidence side with an acute angle defined with respect to the light incidence side; the first portion extends upwards and outwards from the second portion with an obtuse angle defined with respect to the light incidence side, and the second portion is in contact with the corresponding column on the back plate.

12. The backlight module according to claim 11, wherein the light guide plate comprises at least one first recess in an edge opposite to the light incidence side; the backlight module further comprises a second column on the back plate at a position corresponding to each first recess, and a gap is present between the second column and a bottom of the first recess.

* * * * *